US007748940B2

(12) United States Patent
Langenegger

(10) Patent No.: US 7,748,940 B2

(45) Date of Patent: Jul. 6, 2010

(54) APPARATUS FOR THE PERFECT BINDING OF PRINT PRODUCTS TO FORM PRINT ARTICLES

(75) Inventor: Daniel Langenegger, Brittnau (CH)

(73) Assignee: Müller Martini Holdings AG, Hergiswil (CH)

(*) Notice: Subject to any disclaimer, the term of this patent is extended or adjusted under 35 U.S.C. 154(b) by 955 days.

(21) Appl. No.: 11/268,523

(22) Filed: Nov. 8, 2005

(65) Prior Publication Data

US 2006/0097439 A1 May 11, 2006

(30) Foreign Application Priority Data

Nov. 8, 2004 (EP) .................................. 04405685

(51) Int. Cl.

| | |
|---|---|
| ***B42C 11/02*** | (2006.01) |
| ***B42C 11/04*** | (2006.01) |
| ***B42B 5/00*** | (2006.01) |
| ***B42B 2/00*** | (2006.01) |
| ***B42B 2/02*** | (2006.01) |
| ***B65H 5/30*** | (2006.01) |
| ***B65H 39/00*** | (2006.01) |
| ***B65H 39/02*** | (2006.01) |
| ***B65H 41/00*** | (2006.01) |
| ***B65G 37/00*** | (2006.01) |
| ***B65G 47/00*** | (2006.01) |

(52) U.S. Cl. ............................ 412/21; 412/19; 412/33; 270/52.16; 270/52.18; 198/476.1

(58) Field of Classification Search ..................... 412/4, 412/5, 19, 21, 33; 198/470.1, 476.1, 474.1, 198/803.7; 270/52.14, 52.16, 52.18; 269/239, 269/43, 56, 71

See application file for complete search history.

(56) References Cited

U.S. PATENT DOCUMENTS

| | | | | |
|---|---|---|---|---|
| 3,702,129 | A * | 11/1972 | Hawkes et al. | 198/803.7 |
| 4,231,466 | A * | 11/1980 | Rathert | 198/803.7 |
| 4,237,569 | A * | 12/1980 | Muller | 412/16 |
| 4,467,912 | A * | 8/1984 | Rathert | 198/803.7 |
| 4,936,440 | A * | 6/1990 | Focke et al. | 198/427 |
| 5,094,436 | A * | 3/1992 | Stephan, III | 269/153 |
| 6,491,153 | B1 * | 12/2002 | Cassoni et al. | 198/441 |
| 6,736,581 | B1 * | 5/2004 | Cassoni et al. | 412/10 |
| 6,860,475 | B2 * | 3/2005 | Wong | 269/41 |
| 6,966,553 | B2 * | 11/2005 | Rathert | 270/52.18 |

(Continued)

FOREIGN PATENT DOCUMENTS

| | | |
|---|---|---|
| CH | 504 977 | 3/1971 |

(Continued)

*Primary Examiner*—Dana Ross
*Assistant Examiner*—Kyle Grabowski
(74) *Attorney, Agent, or Firm*—Venable LLP; Robert Kinberg; Steven J. Schwarz

(57) ABSTRACT

An apparatus for perfect binding of unbound print products to form bound print products comprises at least one processing station arranged along a circulating path between a feed station for the unbound print products and a delivery station for the bound print products, and a plurality of clamping devices arranged successively along the circulating path and driven jointly. Each of the clamping devices is adapted to hold at least two of the unbound print products such that the unbound print products face the processing station with overhangs that freely project from the clamping device and form spines of the unbound print products.

16 Claims, 5 Drawing Sheets

U.S. PATENT DOCUMENTS

| | | | | |
|---|---|---|---|---|
| 2001/0014265 | A1 | 8/2001 | Holtmeir et al. | |
| 2003/0215309 | A1 | 11/2003 | Engert et al. | |
| 2006/0231998 | A1 * | 10/2006 | Maeder | 270/52.14 |

FOREIGN PATENT DOCUMENTS

| | | | |
|---|---|---|---|
| CH | 667 238 | A5 | 9/1988 |
| DE | 1 214 194 | B | 4/1966 |
| DE | 1 262 221 | B | 3/1968 |
| DE | 43 34 224 | A1 | 4/1995 |
| EP | 0 712 736 | A2 | 5/1996 |

* cited by examiner

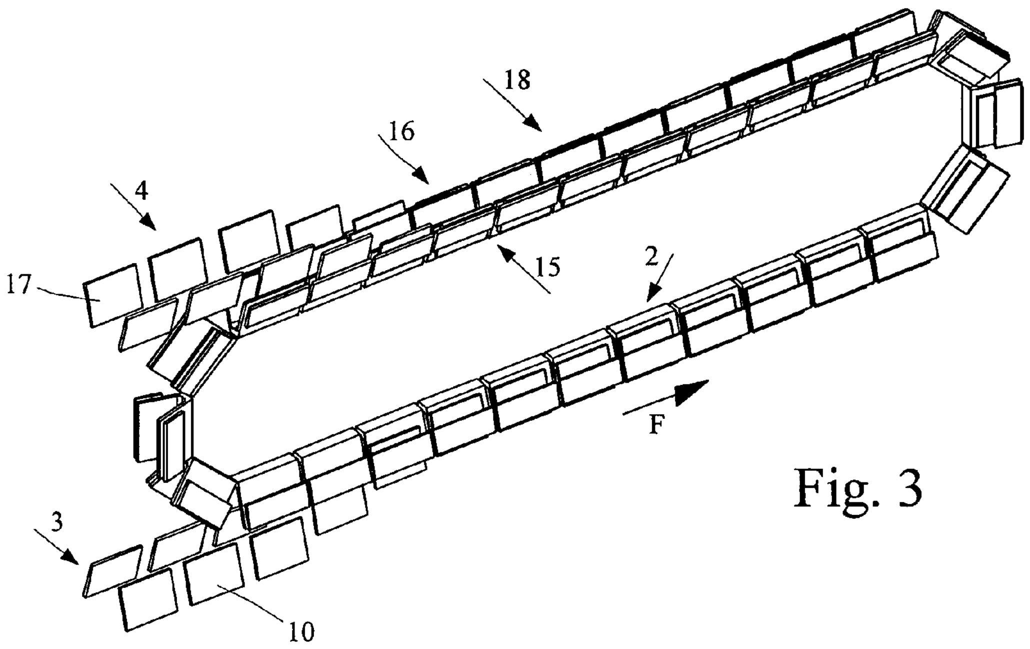
Fig. 3
Fig. 4
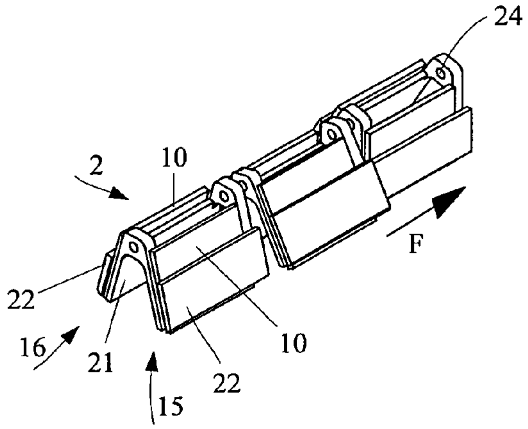
Fig. 5
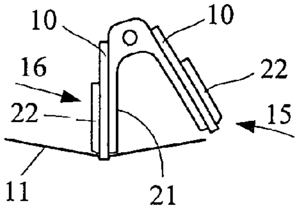
Fig. 6
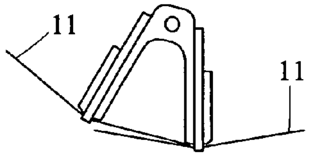

Fig. 12
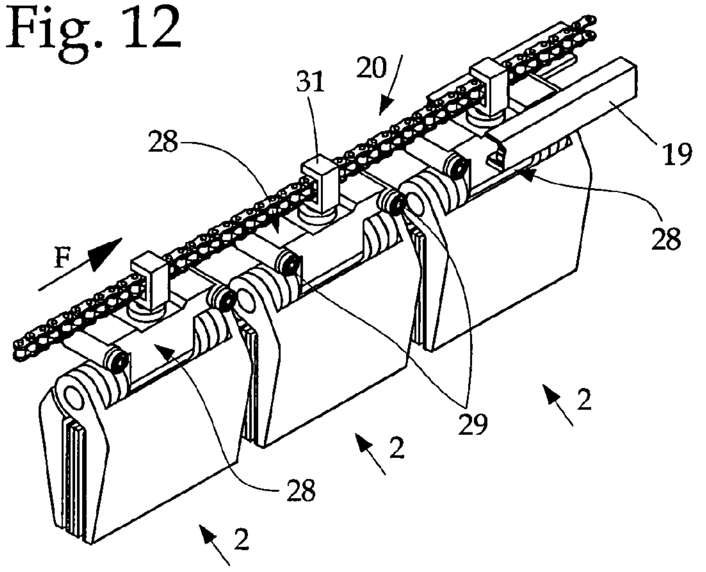
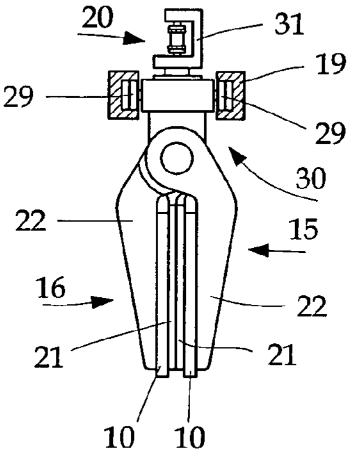
Fig. 13
Fig. 14
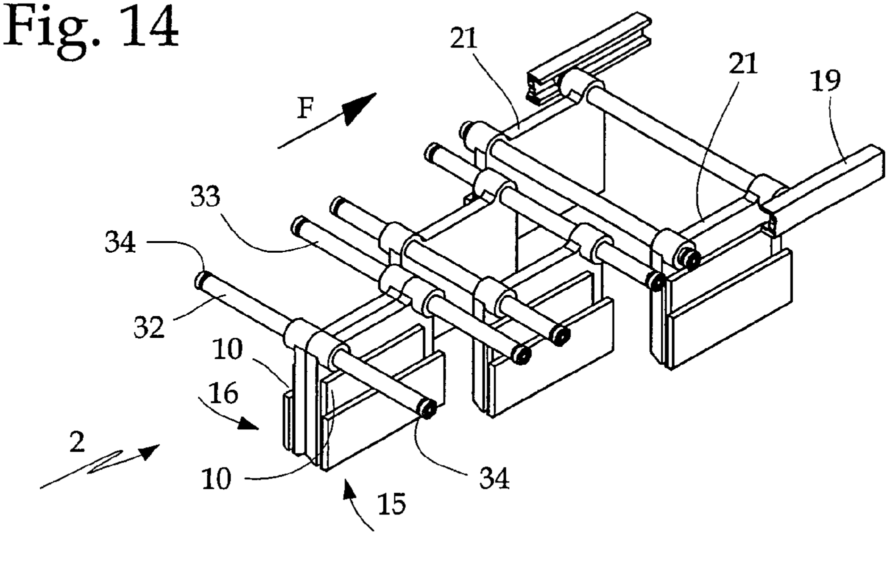

APPARATUS FOR THE PERFECT BINDING OF PRINT PRODUCTS TO FORM PRINT ARTICLES

CROSS-REFERENCE TO RELATED APPLICATION

This application claims the priority of European Patent Application No. 04405685.1-1251, filed on Nov. 8, 2004, the entire content of which is incorporated herein by reference.

BACKGROUND OF THE INVENTION

The present invention relates to an apparatus for the perfect binding of print products, for example, to form print articles such as book blocks, books, or brochures. The apparatus comprises successively arranged and jointly driven clamping devices that are adapted to hold loose and/or unbound print products gathered into loose book blocks. The apparatus also comprises one or more processing stations that are arranged along a circulating path between a feeding station for the gathered print products, and a delivery station for the bound print articles. The clamped-in book blocks face the processing stations with an overhang, which projects freely from the clamping device and forms the spine of a print product.

Apparatuses of this type are often referred to as "perfect binders." They are generally accompanied by an upstream gathering device in which folded print products are stacked one above the other, and are gathered to form a loose book block, that is subsequently supplied to the perfect binder while positioned upright on its spine. The print products can be gathered and/or collected while positioned in the conveying direction (as disclosed in Swiss Patent No. CH 504 977) or while transverse to the conveying direction (as disclosed in European Patent Application No. EP 0 712 736).

The individual, unbound book blocks are transferred using a conveying section, for example, along a slanted path, and are inserted from below into tongs. The tongs are arranged successively, and are driven jointly along a circulating path. The tongs hold the unbound book blocks such that they face the processing stations of the perfect binder along the circulating path with an overhang of approximately 10 millimeters for the processing operation.

A relatively heavy construction of the perfect binding apparatus is usually required, due to the high forces exerted while processing the spine, so as to ensure precise and reliable processing.

The circulating path for the clamping devices can be oval or circular. The clamping devices can comprise tongs that grip an initially unbound book block across the length of its back (e.g., along the projecting overhang). The tongs can comprise two gripping elements, of which at least one can move so as to cooperate with the other. Exemplary embodiments of suitable clamping devices are disclosed in Swiss Patent No. CH 504 977 and Swiss Patent No. CH 667 238.

The production rate of a perfect binder is largely based on the machine timing and/or the laws of physics. For that reason, book block clamping devices used in a perfect binder are usually arranged transverse to the conveying direction, allowing them to be spaced at shorter distances to each other than when arranged longitudinally, even though the apparatus expenditure for processing is considerably higher.

SUMMARY OF THE INVENTION

It is an object of the present invention to provide an apparatus of the aforementioned type which makes it possible to achieve a higher production rate, without loss of quality and reliability.

According to one exemplary embodiment of the invention, an apparatus for perfect binding of unbound print products to form bound print products comprises: at least one processing station arranged along a circulating path between a feed station for the unbound print products and a delivery station for the bound print products; and a plurality of clamping devices arranged successively along the circulating path and driven jointly, each of the clamping devices adapted to hold at least two of the unbound print products such that the unbound print products face the processing station with overhangs that freely project from the clamping device and form spines of the unbound print products.

According to the present invention, loosely gathered book blocks can be fed using multiple conveying sections of a single clamping device. This facilitates increased productivity (i.e., at least double productivity), and/or increased quality and reliability without loss of production capacity.

The clamping devices can each comprise at least two tongs, each of which is adapted to hold a book block.

The circulating path for the clamping devices can extend in a horizontal or vertical plane, thus making it easy to adapt the apparatus to existing space conditions.

The tongs of each clamping device can be arranged side-by-side with respect to the circulating direction, thus furthering the advantages of the invention.

The book blocks can be transferred with the aid of feed sections that empty onto a straight section of the circulating path, thereby simplifying the operation of feeding the perfect binder.

The tongs of each clamping device can be operated jointly, thus making it easier to position the operating mechanisms for picking up and releasing the book blocks.

The operating mechanisms can be controlled using known mechanical, pneumatic and/or electric drive systems.

The tongs of each clamping device can include a joint counter support against which the book blocks are placed in the processing position and to which clamping elements are assigned which can respectively be moved in the direction perpendicular to the circulating direction.

The clamping elements can be adapted to swivel around a swiveling axis, for example, arranged substantially parallel to the circulating direction of the clamping device. Alternatively, the clamping elements can be adapted to move perpendicular to the circulating direction.

It has proven to be advantageous for the counter support to have a yoke-shaped cross section, when viewed transverse to the circulating direction. This can provide favorable stability.

The counter support can be adapted to swivel around a swiveling axis that extends in the circulating direction.

The tongs can swivel around a joint swiveling axis that is arranged parallel to the circulating direction.

The joint axis can be designed as a swiveling axis for both the counter supports and the clamping elements.

The respective counter support for the tongs can also be arranged on the outside of the clamping device.

The parallel axes for the tongs in the circulating direction can be arranged at a distance to each other on the side, thereby resulting in higher mobility.

According to one exemplary embodiment, the tongs of the clamping device can be arranged transverse to the circulating direction and can be distributed symmetrically relative to the circulating path.

BRIEF DESCRIPTION OF THE DRAWINGS

These and other features and advantages of the present invention will be further understood from the following detailed description of the preferred embodiments, with reference to the accompanying drawings, to which reference is made for all further details not described herein.

FIG. 3 is a perspective view of a perfect binder according to another exemplary embodiment of the present invention, having an alternative overhang;

FIG. 4 is a perspective view of swiveling clamping devices according to an exemplary embodiment of the present invention;

FIG. 5 is a side view of a clamping device according to an exemplary embodiment of the present invention, shown in the region of a cover feeder;

FIG. 6 is a side view of the clamping device of FIG. 5, shown in the region of a second, subsequent cover feeder;

FIG. 12 is a perspective view of another exemplary embodiment of an apparatus according to the present invention;

FIG. 13 is a side view of the apparatus shown in FIG. 12;

FIG. 14 is a perspective view of yet another exemplary embodiment of an apparatus according to the present invention.

DETAILED DESCRIPTION OF THE INVENTION

Figure 1:
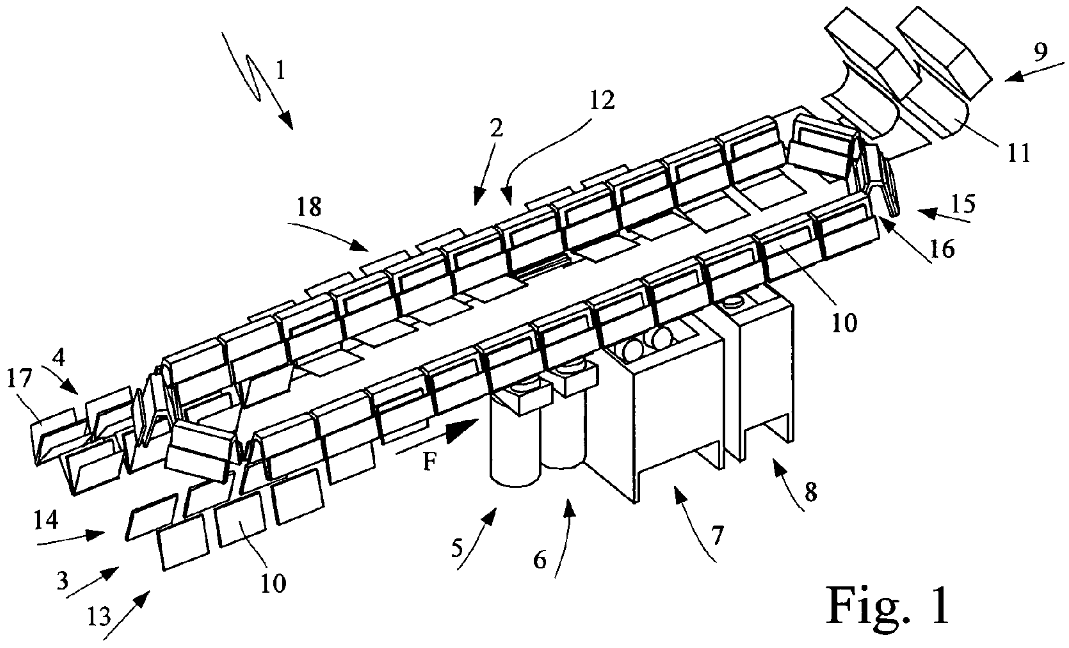
FIG. 1 is perspective view of a perfect binder according to an exemplary embodiment of the present invention, which is positioned in a horizontal plane.

FIG. 1 illustrates a perfect binder 1 for producing print articles (e.g., books, book blocks, brochures, and the like), and in particular, print products comprising folded signatures having an adhesive-bound spine. FIG. 1 also shows a plurality of clamping devices 2 that move in the direction of arrow F along a circular path. The clamping devices 2 each hold two side-by-side clamped-in book blocks 10 that are supplied at a feed station 3, pass by intermediate processing stations, and are discharged at a delivery station 4. FIG. 1 shows two spine-processing stations 5, 6 adapted to trim or rework the spines of book blocks passing by while gripped by the tongs of a clamping device 2. FIG. 1 also shows a glue applicator 7 for spreading glue onto the processed book block spines, as well as an additional glue applicator 8 for applying glue to the side flaps of the book block spine. Also shown is a cover feeding station 9, where a cover 11 is supplied. The cover 11 is fitted over and pressed onto the book block spine and side flaps in a subsequent press-on station 12. The clamping devices 2 shown in FIG. 1 can be adapted to hold two book blocks 10, which have been gathered in a gathering apparatus (not shown) and fed in a loose form to the feed station 3. Two parallel feed sections 13, 14 can be used to supply loose book blocks 10 to the clamping devices 2. At the end of the feed sections 13, 14, a clamping device 2 grasps the two book blocks using two elevated tongs 15, 16, that are arranged beside one another. Alternatively, the book blocks 10 can be fed to the tongs 15, 16 from a different direction than the one shown in FIG. 1. In the exemplary embodiment shown in FIG. 1, the clamping devices 2 travel in a horizontal plane from process station to process station. The finished books 17 finally leave the perfect binder 1 in pairs and along slanted path sections at the delivery station 4. The perfect binder 1 can include a guide mechanism 19 (shown in FIG. 13) along which the clamping devices 2 move in an oval circulating path 18, for example, with the aid of a traction device 20 (also shown in FIG. 13).

Figure 2:
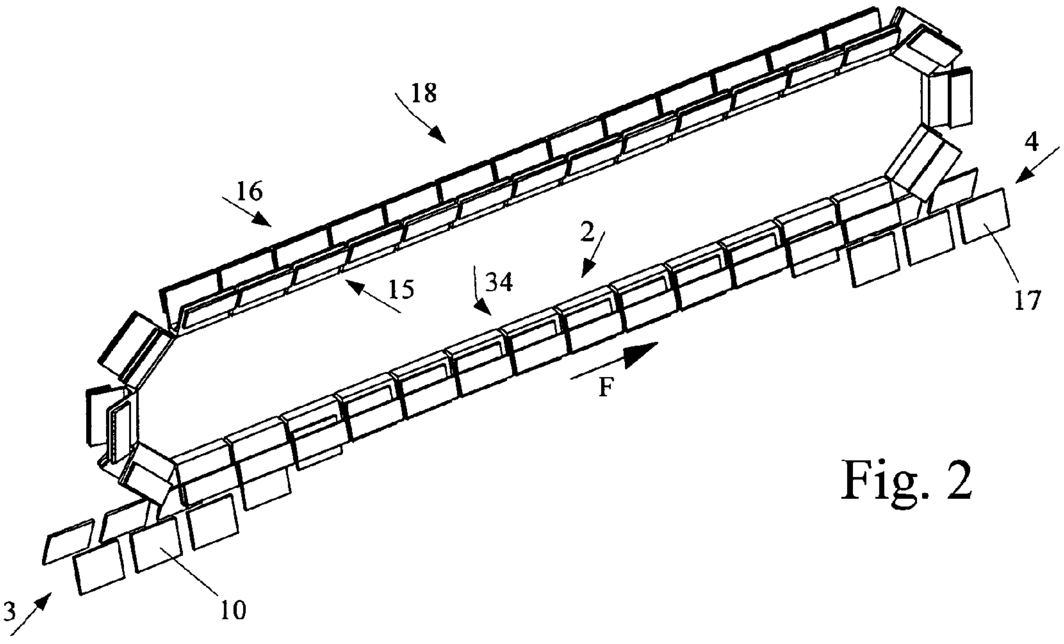
FIG. 2 is a perspective view of a perfect binder according to another exemplary embodiment of the present invention, which is positioned in a vertical plane.

In the exemplary embodiments of FIGS. 2 and 3, the clamping devices 2 move along an oval circulating path 18, however, the circulating path is arranged in a vertical plane instead of a horizontal plane. In the embodiment of FIG. 3, the feed station 3 and the delivery station 4 are positioned one above the other at the end of a conveying section. In contrast, in the embodiment of FIG. 2, the feed station 3 and the delivery station 4 are arranged at the end of a conveying section 34, which is intended for the processing of book blocks 10.

FIG. 4 shows a section of the perfect binder 1 having three clamping devices 2. Each clamping device 2 comprises a counter support 21 having a yoke-shaped cross-section, and a clamping element 22 located on each side. The counter support 21 and two clamping elements 22 jointly form tongs 15, 16. Operating mechanisms 23 (similar to that shown in FIG. 15) may be connected to the clamping devices 2, to open and close the tongs 15, 16. The clamping devices 2 are attached to an adapter (not shown in FIG. 4) that is connected to the circulating traction device 20 (shown for example in FIG. 12), such that the clamping devices can swivel around an axis that extends parallel to the conveying direction F. The swiveling movement to the side of the clamping device 2 is necessary, for example, for processing of a book-block spine, for applying adhesive to the spine, for attaching a cover to the book block spine, and/or other situations where the book block 10 may need to assume an approximately perpendicular position.

FIGS. 5 and 6 show this type of situation for the adhesive attachment of covers 11 to two book block spines. Two glue applicators 7 (shown in FIG. 1) can be arranged one-behind-the-other, or side-by-side, and used to attach a cover 11 to each of the book blocks 10 (which are clamped side-by-side in clamping device 2). As shown in FIGS. 5 and 6, one of the book blocks 10 can be tilted into the perpendicular position first, to attach a cover 11, and then the other book block 10 can be tilted to the perpendicular position, to attach a cover 11. This facilitates an interference-free attachment of the covers 11. The downward pointing legs of the counter support 21 can form an acute angle, and can include an end stop for aligning the book blocks 10 for processing. According to one exemplary embodiment, the operating mechanisms 23 can jointly open and close the tongs 15, 16 of each clamping device.

Figure 7:
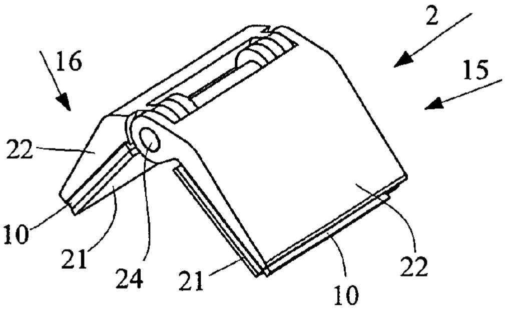
FIG. 7 is a perspective view of another exemplary embodiment of a clamping device according to the present invention.
Figure 8:
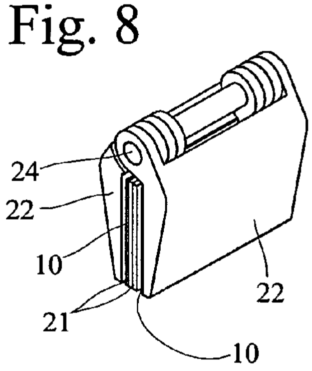
FIG. 8 is a perspective view of the clamping device of FIG. 7, shown in a processing position.

FIGS. 7 and 8 depict another exemplary embodiment of a clamping device 2 that can be swiveled around a swiveling axis 24 that is substantially parallel to the conveying direction F. FIG. 7 shows the clamping device 2 in a spread-apart position with book blocks 10 clamped into each of the tongs 15, 16. The clamping device 2 and the associated tongs 15, 16 can use the axis 24 for both swiveling of clamping device 2, as well as opening and closing of the tongs 15, 16. Referring to FIG. 8, the clamping device 2 is shown in a position where the book block spines are processed and/or where adhesive is spread onto the book block spines.

Figure 9:
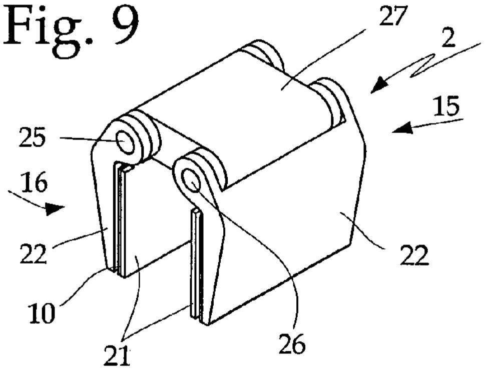
FIG. 9 is a perspective view of another exemplary embodiment of a clamping device according to the present invention.

FIG. 9 shows an exemplary embodiment of a clamping device 2 where the tongs 15, 16 are arranged on swiveling axes 25, 26, respectively, that are spaced apart on a support 27. The axes 25, 26 extend substantially parallel to the conveying direction F.

Figure 10:
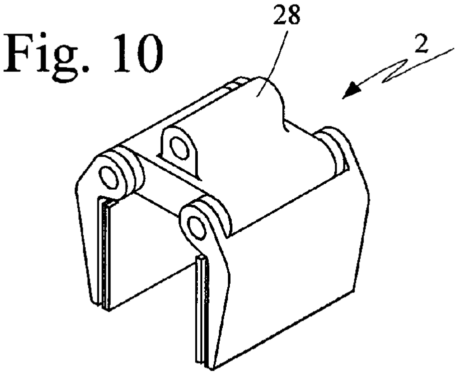
FIG. 10 is a perspective view of yet another exemplary embodiment of a clamping device according to the present invention.
Figure 11:
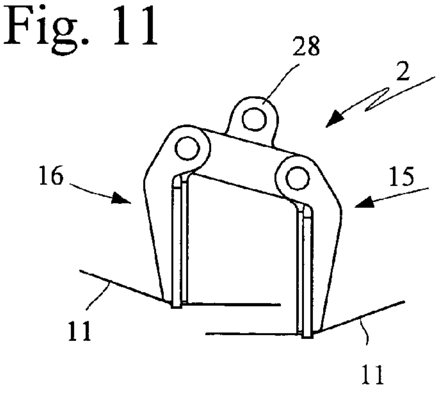
FIG. 11 is a side view of the clamping device of FIG. 10, shown in the region of a cover feeder.

FIGS. 10 and 11 show an alternative embodiment of the clamping device shown in FIG. 9, wherein the clamping device 2 includes a swivel bearing 28. The swivel bearing 28 can be centered between the swiveling axes 25, 26. This exemplary embodiment can facilitate non-problematic attachment of two covers 11 to two book blocks 10 that are clamped into a single clamping device 2, as shown in FIG. 11.

FIG. 12 shows three of the clamping devices 2 shown in FIGS. 7 and 8 attached to a traction device, shown, for example, as a transport chain 20. FIG. 13 shows one of the clamping devices 2 from the side. Each of the clamping devices 2 includes an additional swivel bearing 28. The swivel bearings 28 include roller pairs 29 located at both ends in the conveying direction F. The roller pairs 29 are guided inside a guide mechanism 19. According to this exemplary embodiment, the swivel bearings 28 comprise bogies 30. Adapters 31 connect each of the bogies 30 and/or clamping devices 2 to the traction device 20.

FIG. 14 shows another exemplary embodiment of a clamping device according to the present invention. FIG. 14 shows the clamping device 2 moving along the processing path of a book block 10 in a perfect binder, in a three-step sequence going from the left to the right. The first step in the sequence (at left) shows the book blocks 10 clamped into two tongs 15, 16 of a clamping device 2 for processing the book block spines and spreading adhesive onto the spines. The second step in the sequence (middle) shows the tongs 15, 16 of the clamping device 2 spaced apart toward the sides, for example, for applying glue to the flaps of the book block spine; The last sequence (right) represents, for example, the position where the covers are picked up and/or where they are fitted on without any interference. In comparison to the tongs 15, 16 and clamping devices 2 shown and described in connection with FIGS. 1-13, the embodiment of FIG. 14 includes counter supports 21 that comprise plates that are adapted to move along horizontally extending rods 32, 33. The rods 32, 33 can be arranged substantially transverse to the conveying direction. The clamping elements 22 can also be attached to the rods 32, 33, such that they can be displaced with the aid of operating mechanisms 23, for example, ball boxes. The ends of the rods 32, 33 contain roller bearings 34 that move inside a guide mechanism. The exemplary counter supports 21 shown in FIG. 14 comprise simple plates that can be displaced along the rods 32, 33 with the aid of control means that are not shown.

Figure 15:
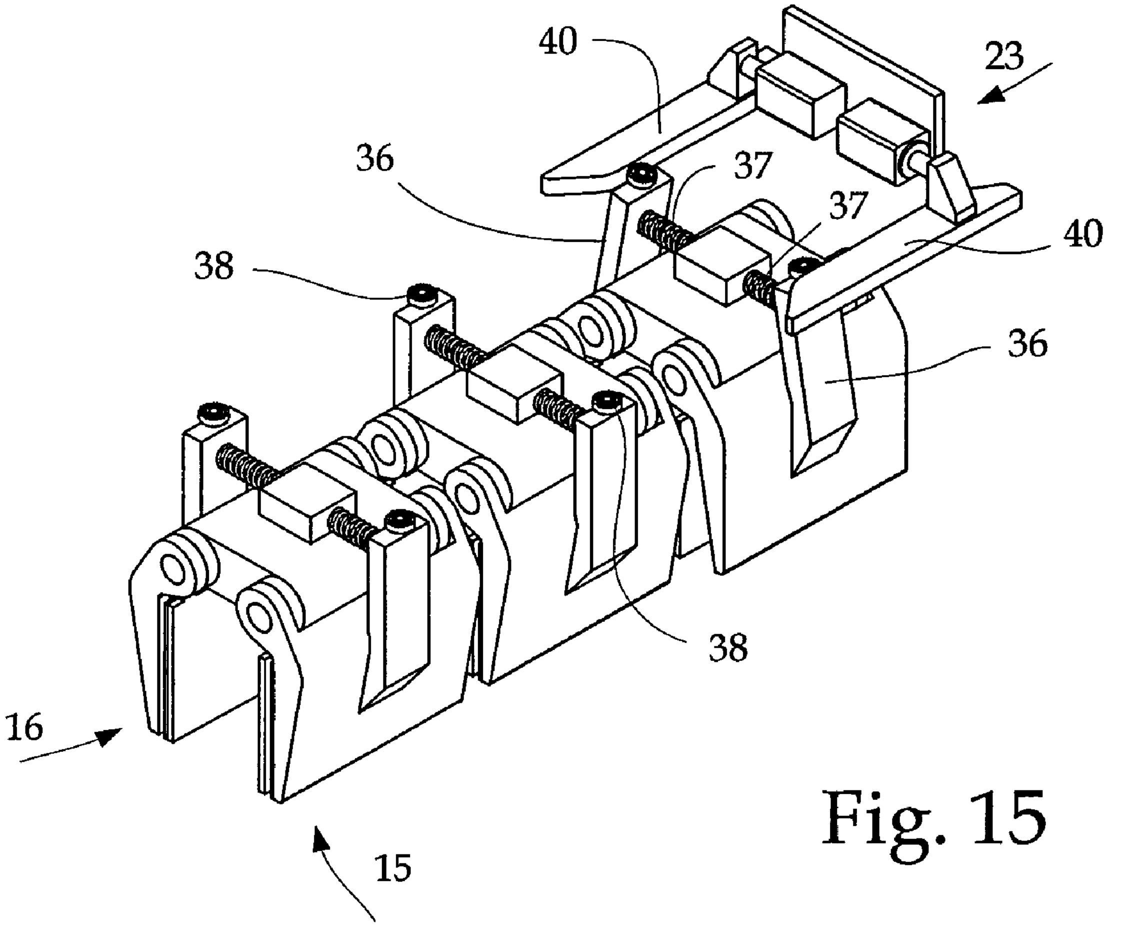
FIG. 15 is a perspective view of the apparatus of FIG. 9, shown with an operating mechanism.

FIG. 15 illustrates an exemplary embodiment of an operating mechanism 23 for opening and closing the tongs 15, 16. In the operating position (i.e., when the books blocks 10 are gripped), the tongs 15, 16 are held closed by springs 37 that act upon the levers 36. Once a clamping device 2 advances to the location of the stationary control bars 40, its tongs 15, 16 are opened with the aid of levers 36, due to contact of control cams 38 (located on levers 36) with the control bars 40.

It will be understood that the above description of the present invention is susceptible to various modifications, changes and adaptations, and the same are intended to be comprehended within the meaning and range of equivalents of the appended claims.

What is claimed is:

1. An apparatus for perfect binding of unbound print products to form bound print products, the apparatus comprising:

at least one processing station arranged along a circulating path between a feed station for the unbound print products and a delivery station for the bound print products; and a plurality of clamping devices arranged successively along the circulating path and driven jointly, each of the clamping devices adapted to hold at least two of the unbound print products such that the unbound print products face the processing station with overhangs that freely project from the respective clamping devices and form spines of the unbound print products;

wherein each of the clamping devices comprises at least two tongs, each tong is adapted to hold at least one unbound print product, and the tongs comprise a joint counter support having clamping elements attached thereto, wherein the clamping elements are movable with respect to the joint counter support in a direction substantially perpendicular to the circulating path.

2. The apparatus of claim 1, wherein the clamping devices are aligned along the circulating path.

3. The apparatus of claim 1, wherein the circulating path extends in at least one of a horizontal plane or a vertical plane.

4. The apparatus of claim 1, wherein the tongs are arranged side-by-side along an axis substantially transverse to the circulating path.

5. The apparatus of claim 1, wherein:

the feed station comprises at least first and second feed sections;

the tongs define at least first and second parallel rows of tongs extending along the circulating path; and the first feed section supplies unbound book blocks to the first row of tongs, and the second feed section supplies unbound book blocks to the second row of tongs.

6. The apparatus of claim 1, further comprising a joint operating mechanism adapted to open and close the tongs.

7. The apparatus of claim 6, wherein the joint operating mechanism is controlled using at least one of a connected mechanical device, a pneumatic device, or an electric drive device.

8. The apparatus of claim 1, wherein the clamping elements are adapted to swivel around an axis that is substantially parallel to the circulating path.

9. The apparatus of claim 1, wherein the clamping elements are adapted to slide in a direction substantially perpendicular to the circulating path.

10. The apparatus of claim 1, wherein the joint counter support has a yoke-shaped cross-section when viewed in a plane extending substantially transverse to the circulating path.

11. The apparatus of claim 10, wherein the joint counter support is adapted to swivel around an axis extending substantially parallel to the circulating path.

12. The apparatus of claim 11, wherein the joint counter support is arranged on an inside portion of the clamping device.

13. The apparatus of claim 11, further comprising first and second clamping elements adapted to swivel with respect to the counter support about respective first and second substantially parallel axes, wherein the first axis is spaced from the second axis.

14. The apparatus of claim 1, wherein the tongs are adapted to swivel around a joint swiveling axis that is substantially parallel to the circulating path.

15. The apparatus of claim 1, wherein the tongs of each clamping device are arranged along a line extending substantially transverse to the circulating path, and equal amounts of the tongs are distributed on both sides of the circulating path.

16. An apparatus for perfect binding of unbound print products to form bound print products, the apparatus comprising:

at least one processing station arranged along a circulating path between a feed station for the unbound print products and a delivery station for the bound print products; and a plurality of clamping devices arranged successively along the circulating path and driven jointly, each of the clamping devices adapted to hold at least two of the unbound print products such that the unbound print products face the processing station with overhangs that freely project from the respective clamping devices and form spines of the unbound print products;

wherein each of the clamping devices comprises at least two tongs, and each tong is adapted to hold at least one unbound print product;

further wherein the tongs are adapted to swivel around a joint swiveling axis that is substantially parallel to the circulating path, and the clamping elements are adapted to swivel with respect to the joint counter support around the joint swiveling axis.

* * * * *